A. ZACHMEIER.
Saw-Guide for Saw-Mills.

No. 217,189. Patented July 1, 1879.

Witnesses:
J. W. Garner
W. S. D. Haines

Inventor:
A. Zachmeier,
per
F. A. Lehmann
atty

UNITED STATES PATENT OFFICE.

ANTHONY ZACHMEIER, OF SHAWNEETOWN, ILLINOIS.

IMPROVEMENT IN SAW-GUIDES FOR SAW-MILLS.

Specification forming part of Letters Patent No. 217,189, dated July 1, 1879; application filed May 8, 1879.

*To all whom it may concern:*

Be it known that I, ANTHONY ZACHMEIER, of Shawneetown, in the county of Gallatin and State of Illinois, have invented certain new and useful Improvements in Saw-Guides; and I do hereby declare the following to be a full, clear, and exact description of the invention, such as will enable others skilled in the art to which it pertains to make and use it, reference being had to the accompanying drawings, which form part of this specification.

My invention relates to an improvement in resawing-machines; and it consists in the peculiar form and manner of operating the saw-guides, whereby any splinters, knots, or pieces of bark which drop down between the saw and the guides and wedge in between them can be readily removed without stopping the machine; and, further, it consists in a movable saw-protector, which is made to separate the lumber as it is sawed, and which can be adjusted toward the saw as its edge wears away, as will be more fully described hereinafter.

Figure 1:
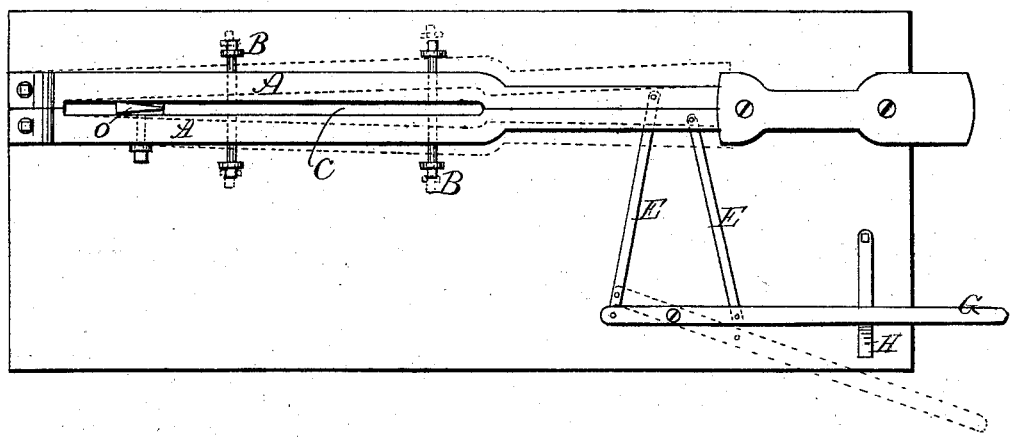
Figure 2:
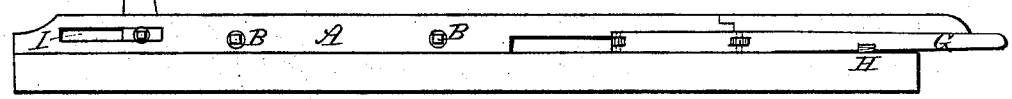

Figure 1 is a plan view of my invention. Fig. 2 is a side view of the same.

A A represent the two halves of the movable saw-guides, which are pivoted at one end, and have a slot, C, of sufficient size made between them, to allow the top of the saw to project up between them to any desired distance. Each of these guides is provided with set-screws B, which can be made to bear against both sides of the edges of the saw, and thus hold it as steady and true as may be desired. Secured or otherwise fastened to each half of this guide is a suitable connecting-rod, E, which rods have their ends pivoted to the hand-lever G, which lever is held in position by means of the suitable spring-catch H. When this lever is moved toward the right the two halves of the guide are drawn tightly together; but when the lever is moved to the left the two rods, moving in opposite directions, force the two halves of the guide sufficiently far apart to allow any splinters, knots, or pieces of bark from the wood being sawed, and which may have wedged in between the guide and the saw, to be readily removed before the saw is injured, and that without stopping the machine. This method of operating the guides will be found to be a great convenience, for the guides can be quickly separated, so as to remove any obstruction before the saw is injured, and can be as quickly brought into position again.

In one half of the guide there is made a slot, I, at its pivoted end, in which is secured the blade or preserver O, which can be moved sufficiently near to the saw to be sure to get into the saw-cut and hold the two halves of the resawed board apart. When the saw wears smaller and is moved toward the feed-rolls, and the preserver is not moved also, it often happens, in resawing thin bevel-ended or twisting lumber, that both halves of the resawed board pass on one side of the preserver, and thus press the saw into the iron guides, so as to tear off the points of the teeth and twist and sometimes ruin the saw.

Having thus described my invention, I claim—

1. A movable saw-guide composed of two parts, A A, and which are connected to the lever G by means of the connecting-rods E, substantially as shown.

2. The combination of the saw-guide A A, having a slot, I, with the movable preserver O, substantially as set forth.

In testimony that I claim the foregoing I have hereunto set my hand this 28th day of April, 1879.

ANTHONY ZACHMEIER.

Witnesses:
SAMUEL H. BARTLEY,
JOSEPH ZACHMEIER.